US008755091B2

(12) United States Patent
Liao et al.

(10) Patent No.: US 8,755,091 B2
(45) Date of Patent: Jun. 17, 2014

(54) METHOD FOR ADDING SCAN DATA TO COMPUTER WORK AREA

(75) Inventors: Chun-Chieh Liao, Hsinchu (TW); Skies Hwang, Pingtung County (TW); Mitch Lin, Pingtung County (TW)

(73) Assignee: Avision Inc. (TW)

( * ) Notice: Subject to any disclaimer, the term of this patent is extended or adjusted under 35 U.S.C. 154(b) by 92 days.

(21) Appl. No.: 13/472,167

(22) Filed: May 15, 2012

(65) Prior Publication Data
US 2012/0293844 A1 Nov. 22, 2012

(30) Foreign Application Priority Data

May 16, 2011 (TW) .............................. 100116976 A

(51) Int. Cl.
H04N 1/04 (2006.01)
G06F 3/12 (2006.01)
G06K 15/00 (2006.01)
H04N 1/00 (2006.01)
G06F 3/048 (2013.01)

(52) U.S. Cl.
USPC ......... 358/474; 358/1.15; 358/1.16; 358/403; 715/769

(58) Field of Classification Search
USPC ................. 358/474, 1.15, 1.16, 403; 715/769
See application file for complete search history.

(56) References Cited

U.S. PATENT DOCUMENTS

| 8,279,479 | B2 * | 10/2012 | Dowling et al. | 358/1.15 |
| 2007/0133074 | A1 * | 6/2007 | Fabrice | 358/537 |
| 2010/0214610 | A1 * | 8/2010 | Otsuka | 358/1.15 |
| 2012/0096379 | A1 * | 4/2012 | Bell et al. | 715/769 |

* cited by examiner

*Primary Examiner* — Charlotte M Baker
*Assistant Examiner* — Rury Grisham

(57) ABSTRACT

A method for adding scan data to a computer work area is provided. The method includes the following steps. Location information corresponding to a registered location of a pointer is received. According to the location information, an image file format is determined. A document is scanned. Next, a scan image file corresponding to the document and the image file format is produced. The scan image file is added to a work area where the pointer is located.

16 Claims, 17 Drawing Sheets

METHOD FOR ADDING SCAN DATA TO COMPUTER WORK AREA

CROSS REFERENCE TO RELATED APPLICATIONS

This application claims the benefit of the foreign application priority of Taiwan Application No. 100116976, which was filed on May 16, 2011 and is incorporated herein by reference.

BACKGROUND OF THE INVENTION

1. Field of the Invention

The present invention relates generally to a method for adding scan data to a computer work area, and especially relates to the method for adding scan image files or text to a work area in the computer operating system.

2. Description of the Prior Art

The conventional scan operation comprises the following steps. First, the user opens a scanner application program on the computer and selects the scanner and its driver via the user interface. Then the user selects the image output mode and the output destination of scan image files. If the user selects the PDF reader as the program for viewing a scan image, when the scan operation is completed the obtained scan image file will be opened in a new window of the PDF reader. If the user selects the default storage path, such as the "My Documents" file folder, as the output destination, the scan image file will be stored in the "My Documents" file folder.

However, in the above scan operation it takes the user much time in setting up the scanner application program. And, if the user needs to insert the scan image file as an object in a word file, the user must open up the word file first and perform the procedure for "Insert Object" step by step.

SUMMARY OF THE INVENTION

Accordingly, an object of the present invention is to provide a method for adding scan data to a computer work area, where scan data can be automatically and directly stored in the active working environment or inserted in the registered location of a computer pointer, such as a mouse cursor.

In one embodiment, the present invention relates to a method for adding scan data to a computer work area, where the scan data are included in a scan image file. The method comprises following steps: receiving location information corresponding to a registered location of a pointer; determining an image file format according to the location information; instructing a scanner to scan a document; obtaining a scan image file corresponding to the document and the image file format; and adding the scan image file to a work area where the pointer is located.

Further, in another embodiment, the present invention relates to a method for adding scan data to a computer work area, where the scan data are text data. The method comprises following steps: receiving location information corresponding to a registered location of a pointer; instructing a scanner to scan a document; obtaining a scan image file corresponding to the document; performing character recognition on the scan image file; and adding the recognized characters to a work area where the pointer is located.

The present invention saves the time for setting function parameters and output destinations prior to the document-scan operation. The user does not need to repeatedly set it up for each individual document and open the resulting scan image file manually for post-editing. The present invention allows the scan data to be added to any active window automatically once the scan operation is completed.

These and other objects, features and advantages of the present invention will become apparent upon consideration of the following detailed description of the preferred embodiment that is illustrated in the various figures and drawings.

DETAILED DESCRIPTION

FIGS. 1 to 9 illustrate examples of computer systems in which the present invention may be implemented. Each computer system comprises a computer 10 and a scanner 20, being interconnected. The computer 10 transmits scan command CS to the scanner 20 to control the scanner 20 and receives scan image data/file DI from the scanner 20 for post-processing. The scanner 20 can be a peripheral device which only generates raw data and relies on the computer 10 to do all the image-processing, compression, conversion and etc. Alternatively, the scanner 20 can have an image processor of its own and is capable of processing and converting scan image data and sending image files DI to the computer 10 for viewing or storage. In the following embodiments, the computer systems are exemplified by individual computers and scanners; however, the computer systems are not limited thereto. The computer systems implementing the present invention may include any scanning device or multi-function printer on which is installed an operating system (OS), or computers, or mobile device, and scanners interconnected via Ethernet, LAN, internet, or wireless connection.

Generally, the computer 10 must be installed an operating system (OS), such as Windows, Mac, to run application programs. Through the Graphical User Interface (GUI), the users can interact with the computer 10. The most important interface is the cursor, which is moved by the user to click on, drag and drop objects like windows and to select and execute application programs, files, texts, and buttons on menu bars. Cursors may include any pointers displayed and used on the GUI, not limited to mouse cursors. With reference to FIGS. 1 to 9, details of the execution of the computer systems will be explained in the embodiments.

Figure 10:
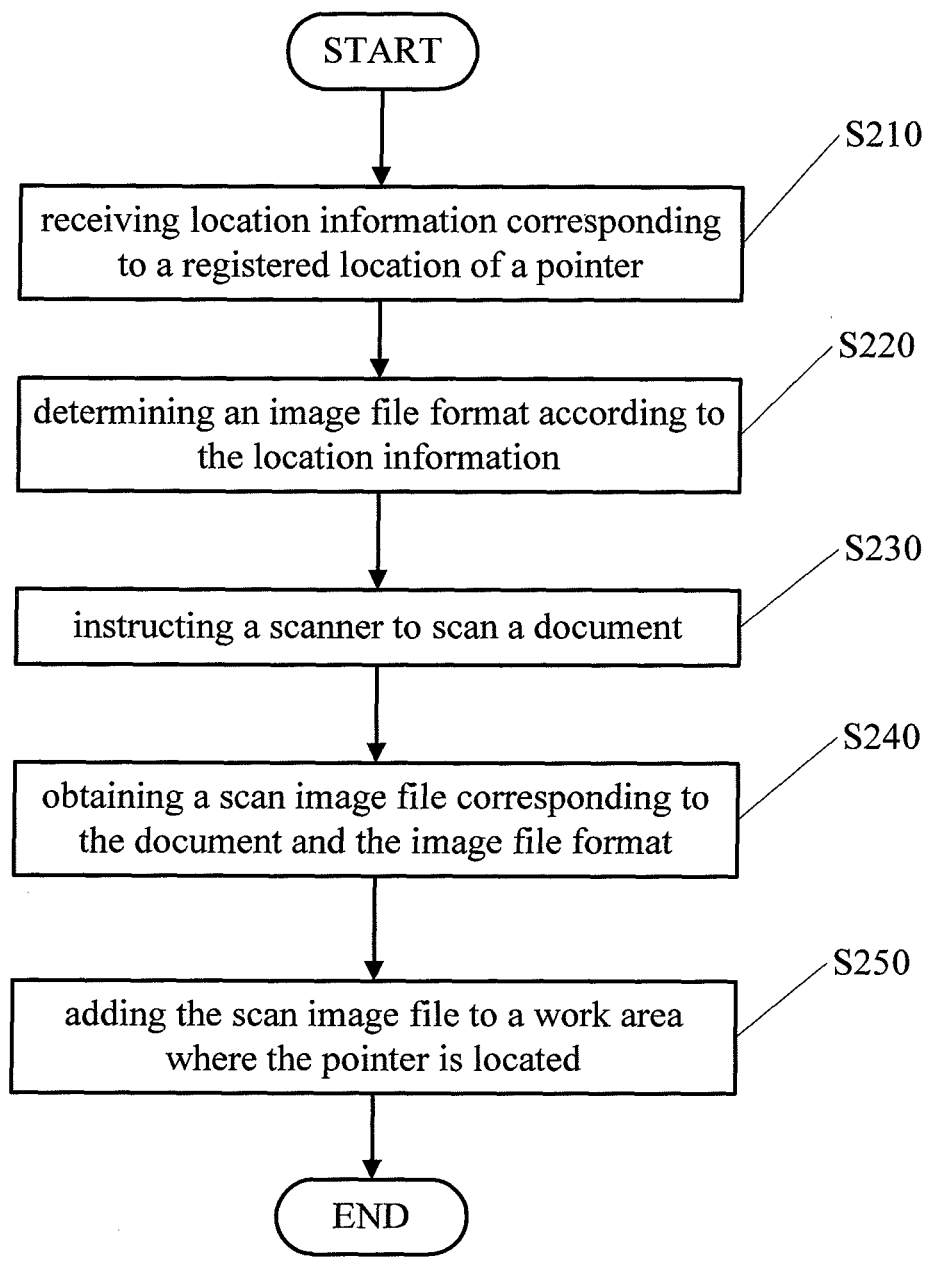
FIG. 10 is a flow chart of a method for adding scan data to a computer work area according to the present invention.

FIG. 10 is a flow chart of a method for adding scan data to a computer work area according to the present invention. Referring to FIG. 10, the method of the present invention is implemented in a computer system and comprises the following steps.

Step S210: receiving location information corresponding to a registered location of a pointer. The user moves the pointer to any location on a work area of the OS and, through the motion of click or drag and drop, the user selects an object, text, or window on GUI. When any thing is selected, the location of the pointer is registered and the computer receives the location information of the pointer. For example, if the user selects the frame or inside of an opened application window, the application window becomes active and the registered location of the pointer will be at the application window.

Step S220: determining an image file format according to the location information. The registered location of the pointer determines the image file format of the scan image file obtained by the user. The image files may be in any of a variety of formats, such as jpeg, tiff, pdf, bmp, or gif.

Step S230: instructing a scanner to scan a document. After, for example, an application window is selected, the user can start the scan operation by pressing a scan button on computer or at the scanner. The computer will send a scan command to scanner to start the process. The scan command may include a scan-start signal and function setting parameters. And the document placed on the scanner is scanned accordingly.

Step S240: obtaining a scan image file corresponding to the document and the image file format. Depending on the model types of the scanners, the scan image data resulting from the scan operation maybe converted to the scan image file at the scanner or at the computer.

Step S250: adding the scan image file to a work area where the pointer is located. After the scan image file corresponding to the document and the image file format is obtained, the computer adds the scan image file to the work area by the means of storing, opening, inserting, or attaching the scan image file, according to the attributes of the work area where the pointer is located.

Figure 1:
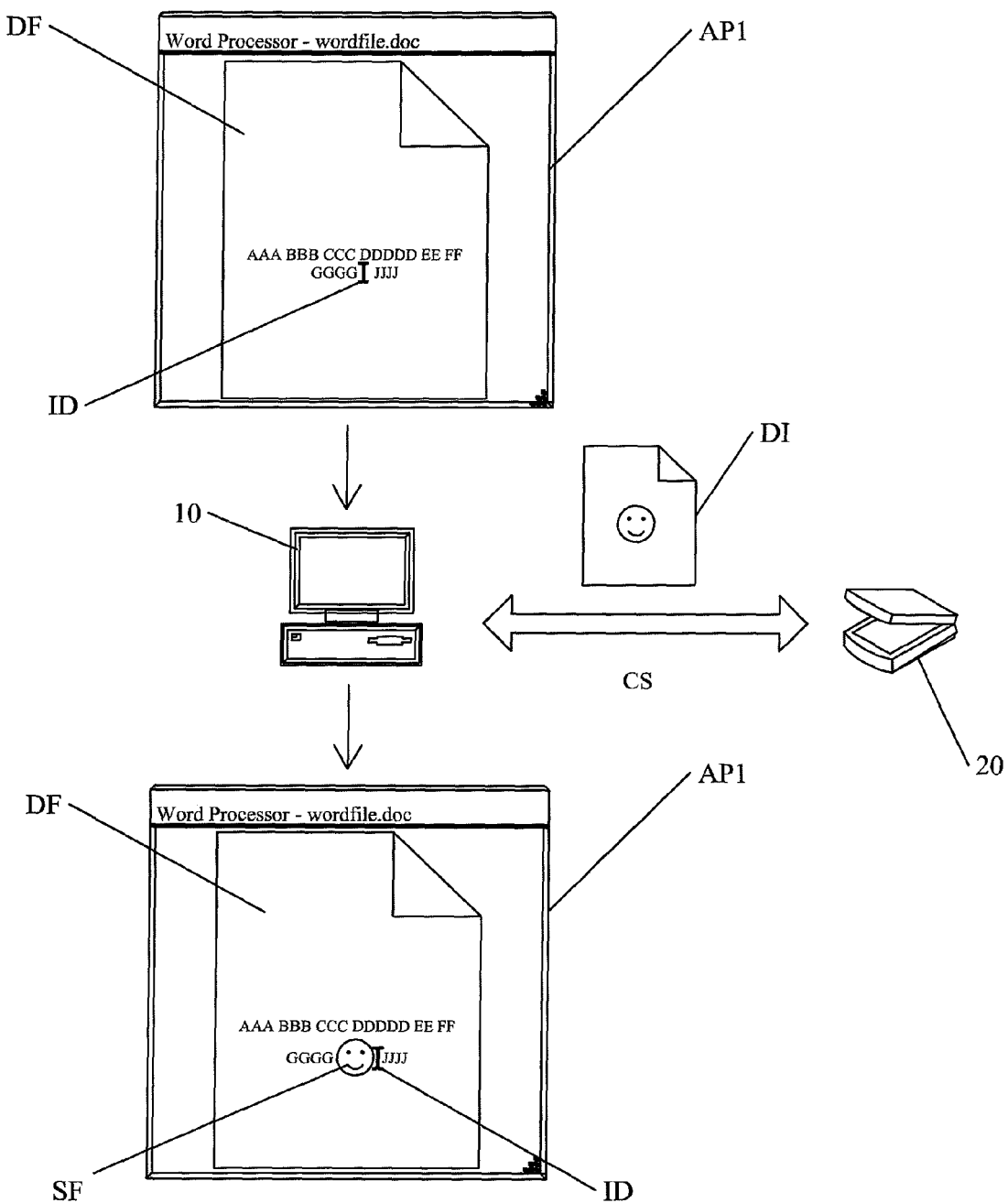
FIGS. 1 to 9 illustrate examples of computer systems in which the present invention may be implemented.
Figure 11:
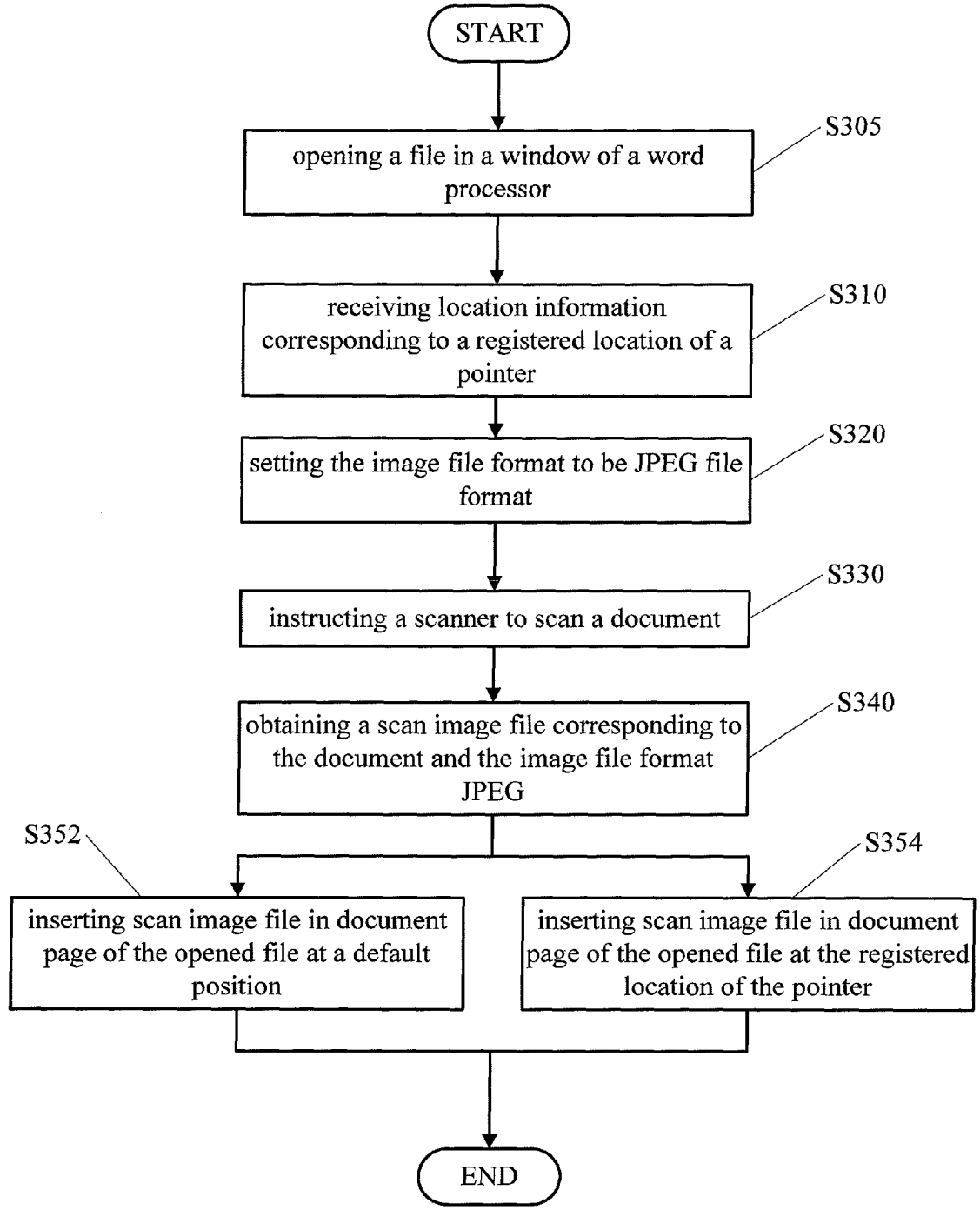
FIG. 11 is a flow chart of a method for adding scan data to a computer work area according to a first embodiment of the present invention.

FIG. 11 is a flow chart of a method for adding scan data to a computer work area according to a first embodiment of the present invention. Referring to FIG. 11 and FIG. 1, the method comprises the following steps.

Step S305: opening a file DF in a window of a word processor AP1. For the purpose of editing, the file DF is opened in the word processor AP1. A word processor could be application programs such as Word, Excel, PowerPoint, or any web-based word processors, which are capable of text editing. Alternatively, if the user has already opened a file, or is the middle of editing a file, the step could be omitted.

Step S310: receiving location information corresponding to a registered location of a pointer ID. In this embodiment, as shown in FIG. 1, the pointer ID is moved to and located at a document page of the opened file DF.

Step S320: determining an image file format according to the location information. Because the registered location of the pointer ID is at the document page of the document, the computer 10 sets a graphical file format, e.g. jpeg, as the image file format for scan image files.

Step S330: instructing a scanner 20 to scan a document. In the first to fifth embodiments, the scanner 20 is exemplified by a peripheral scanner.

Step S340: obtaining a scan image file SF corresponding to the document and the image file format JPEG determined in step S320. After the scanner 20 completes the scan operation, the resulting scan image data DI is generated and transmitted to the computer 10. The computer 10 processes the scan image data DI in a JPEG scan image file SF. The step S340 is followed by step S352 or step S354 for inserting the scan image file SF in the document page.

Step S352: inserting the scan image file SF in the document page of the opened file DF at a default position; or proceed to step S354.

Step S354: inserting the scan image file SF in the document page of the opened file DF at the registered location of the pointer ID, which is between two characters, as shown in FIG. 1.

Figure 2:
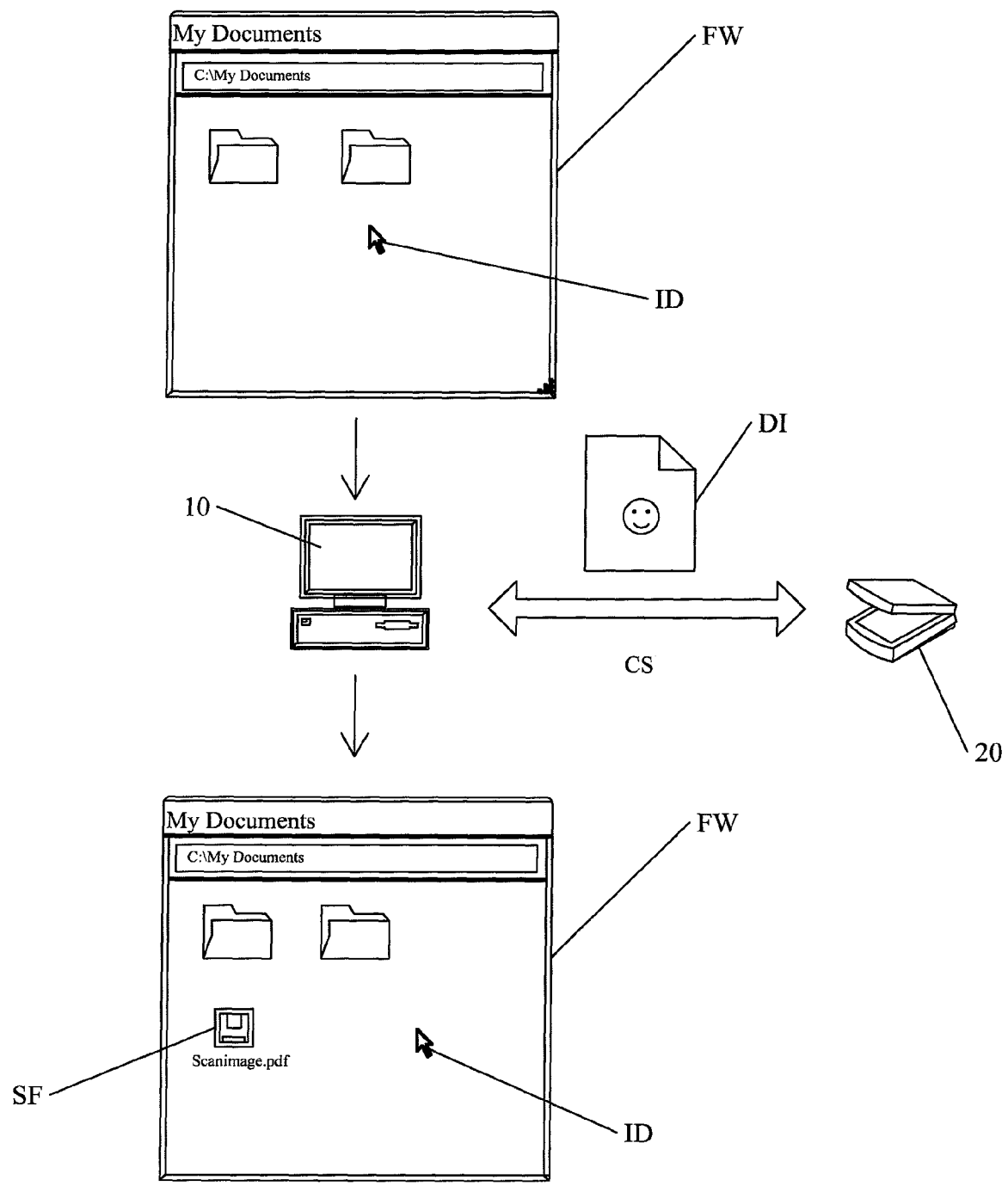
Figure 12:
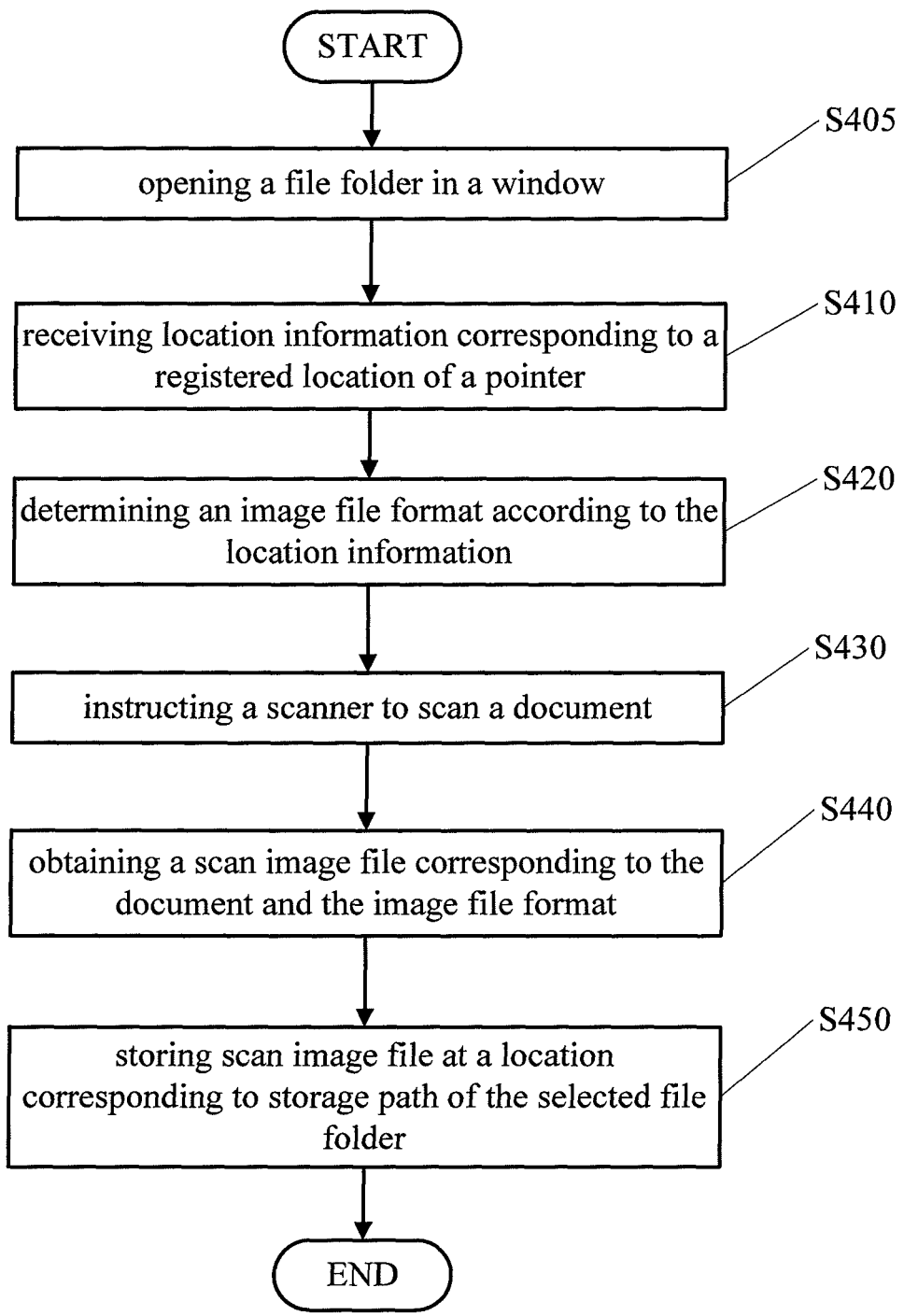
FIG. 12 is a flow chart of a method for adding scan data to a computer work area according to a second embodiment of the present invention.

FIG. 12 is a flow chart of a method for adding scan data to a computer work area according to a second embodiment of the present invention. Referring to FIG. 12 and FIG. 2, the method comprises the following steps.

Step S405: opening a file folder in the OS. As shown in FIG. 2, the "My Documents" file folder is opened in a window FW. The step can be omitted if a file folder intended for storing a scan image file is already opened.

Step S410: receiving location information corresponding to a registered location of a pointer ID. In this embodiment, as shown in FIG. 2, when the user moves the pointer ID to the inside of the window FW or clicks on the window FW, the pointer ID is registered as located at the window FW.

Step S420: determining an image file format according to the location information. Because files in any file format can be stored in the file folder, the image file format of scan image files therefore is not limited to only a certain number of choices. The computer 10 may determine the image file format as it sees suitable, or according to user preference settings, which may require the color scan image data to be converted to a graphical file, e.g. a jpeg file, and b/w scan image data to be converted to a document/graphical file format, e.g. a .pdf file.

Step S430: instructing a scanner 20 to scan a document. In this embodiment the scanner 20 scans the document in the b/w mode.

Step S440: obtaining a scan image file SF corresponding to the document and the image file format. After the scanner 20 completes the scan operation, the resulting scan image data DI is generated and transmitted to the computer 10. The computer 10 processes and converts the scan image data DI to a scan image file SF in .pdf file format.

Step S450: storing the scan image file SF at a location corresponding to a storage path of the selected file folder. As shown in FIG. 2, since the storage path of the "My Documents" file folder is C:\My Documents, the scan image file SF is stored in the path of C:\My Documents. In this embodiment, the selected file folder is shown as in a separate opened window FW; however, the selected file folder may also be a selected file folder displayed as a highlighted icon in a file manager window. In this case, the scan image file SF would be stored in the path of the selected file folder.

Figure 3:
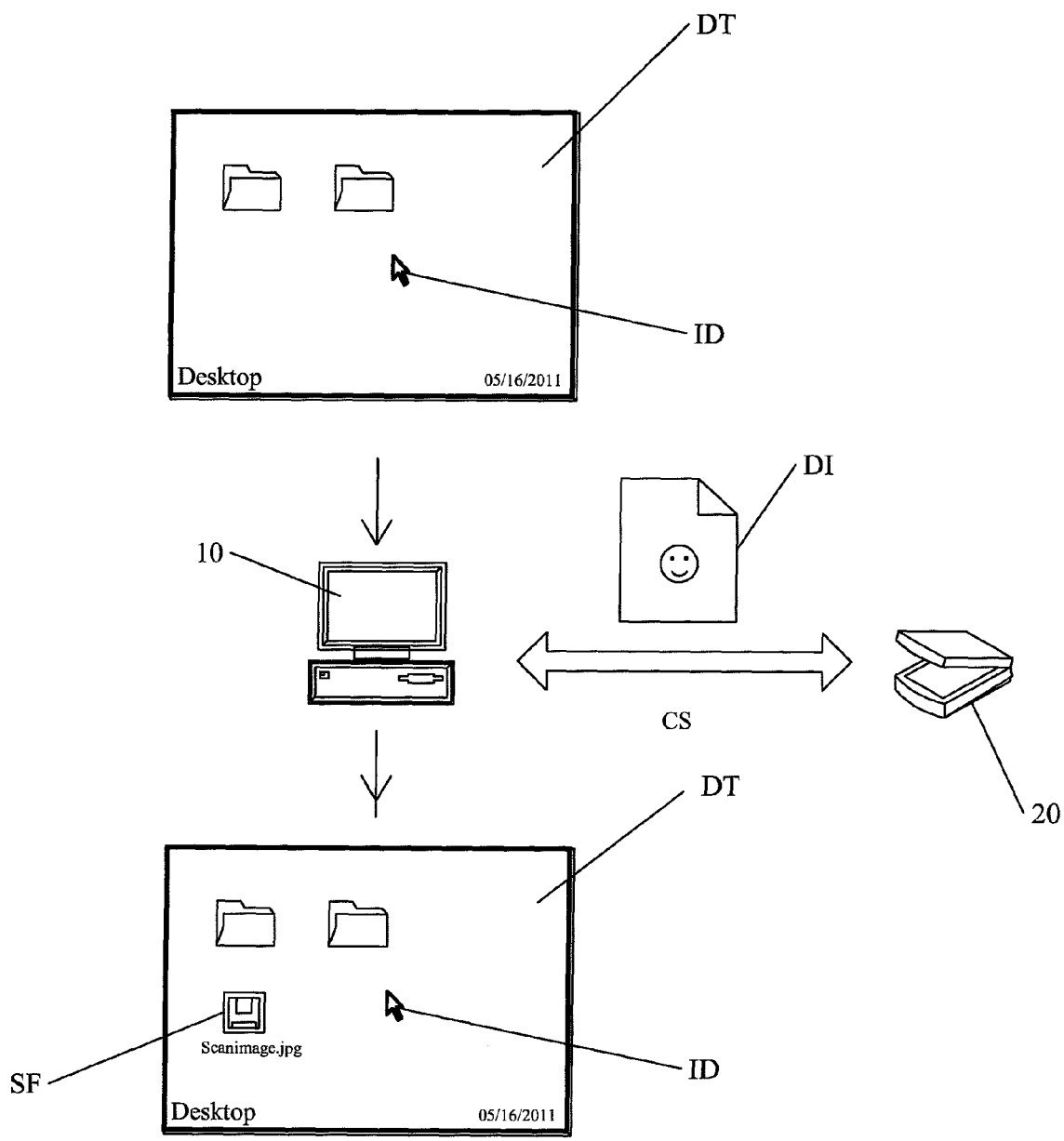
Figure 13:
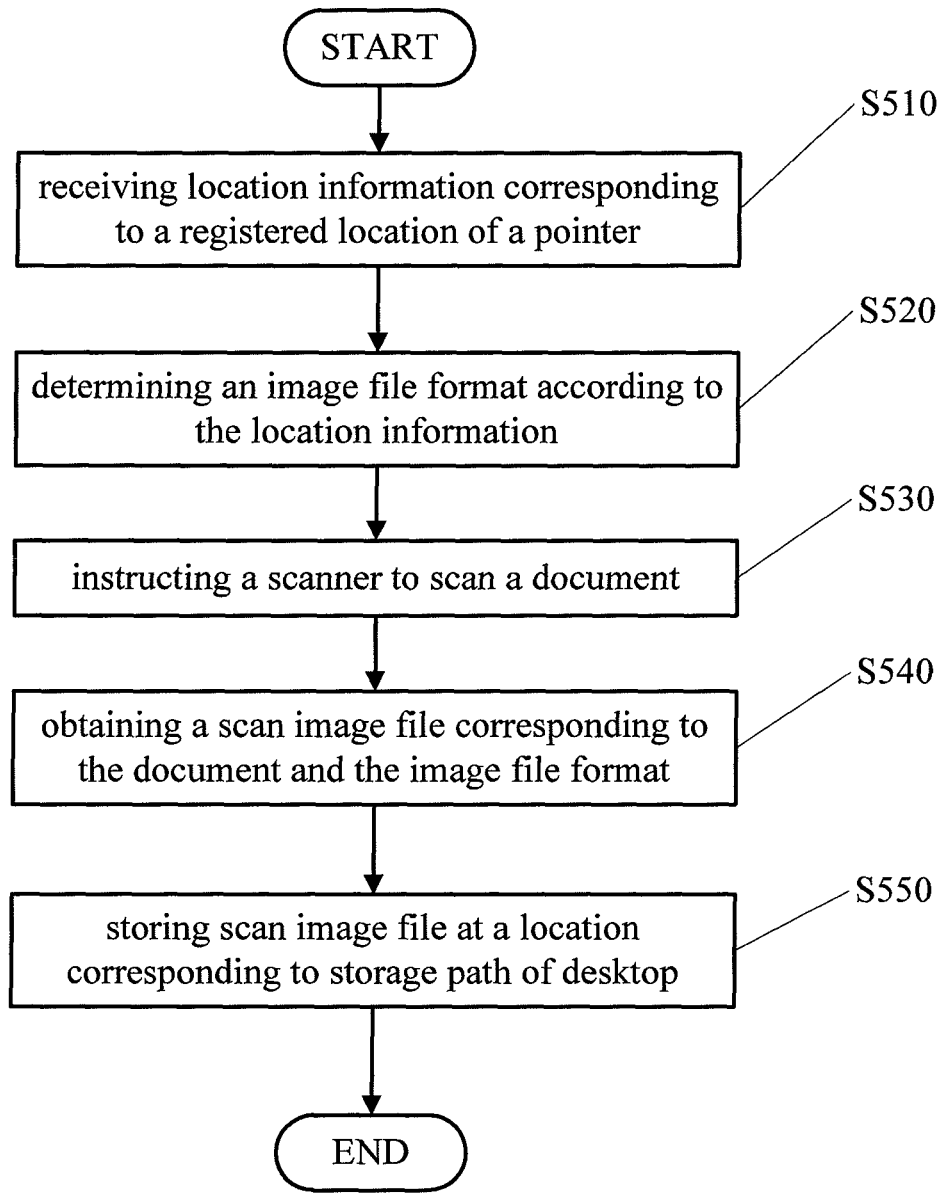
FIG. 13 is a flow chart of a method for adding scan data to a computer work area according to a third embodiment of the present invention.

FIG. 13 is a flow chart of a method for adding scan data to a computer work area according to a third embodiment of the present invention. Referring to FIG. 13 and FIG. 3, the method comprises the following steps.

Step S510: receiving location information corresponding to a registered location of a pointer ID. In this embodiment, the pointer ID is located on the desktop DT of the OS. When all the application windows are closed, or when the pointer ID is moved to the desktop DT, the registered location of the pointer ID is at the desktop DT, as shown in FIG. 3.

Step S520: determining an image file format according to the location information. As in the second embodiment, files in any file format can be stored on the desktop DT of the OS; the computer 10 may determine the image file format as it sees suitable, or according to user preference settings.

Step S530: instructing a scanner 20 to scan a document. In this embodiment the scanner 20 scans the document in the color mode.

Step S540: obtaining a scan image file SF corresponding to the document and the determined image file format. After the scanner 20 completes the scan operation, the resulting scan image data DI is generated and transmitted to the computer 10. The computer 10 processes and converts the scan image data DI to a scan image file SF in .jpg file format.

Step S550: storing the scan image file SF at a location corresponding to a storage path of the desktop DT.

Figure 4:
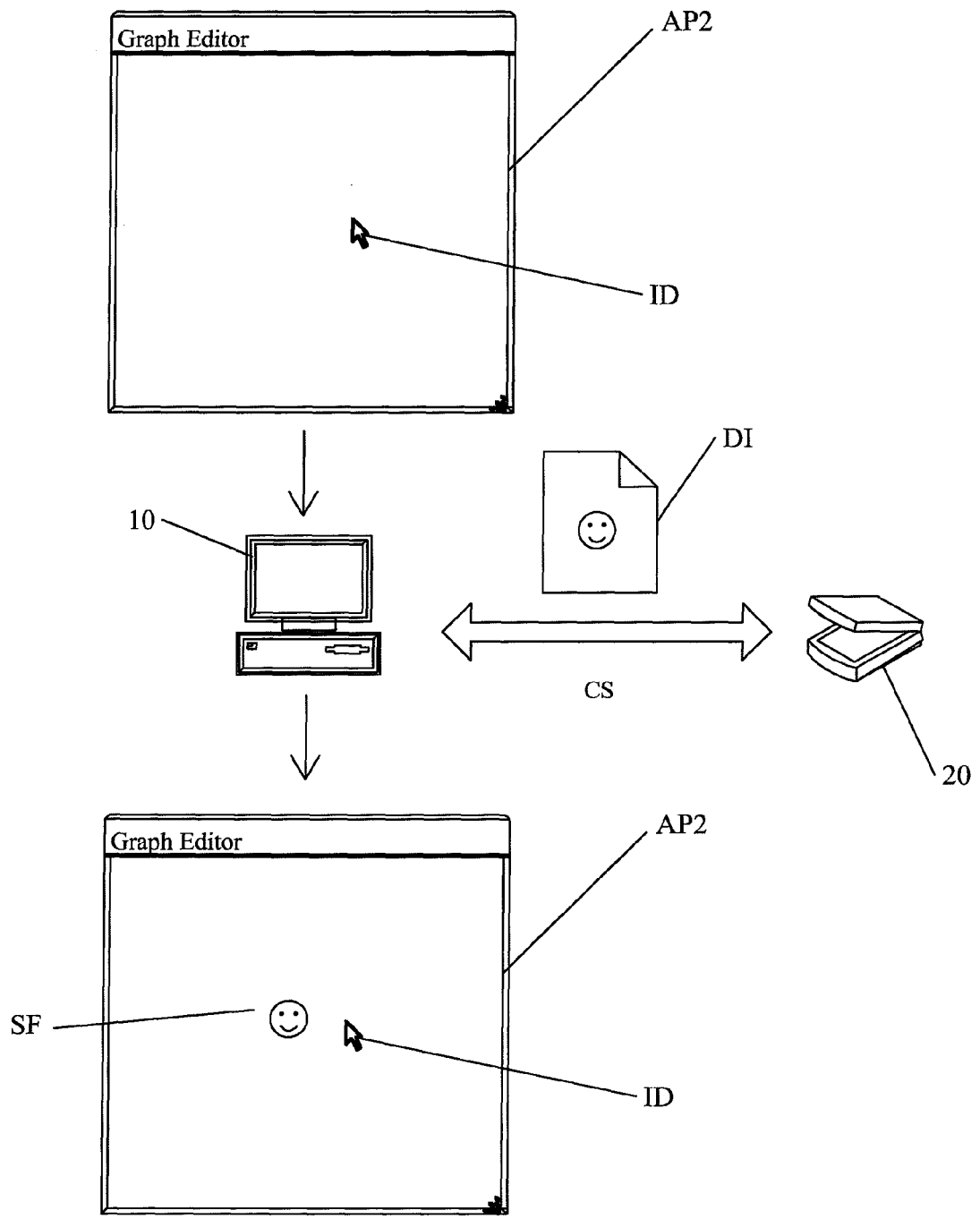
Figure 14:
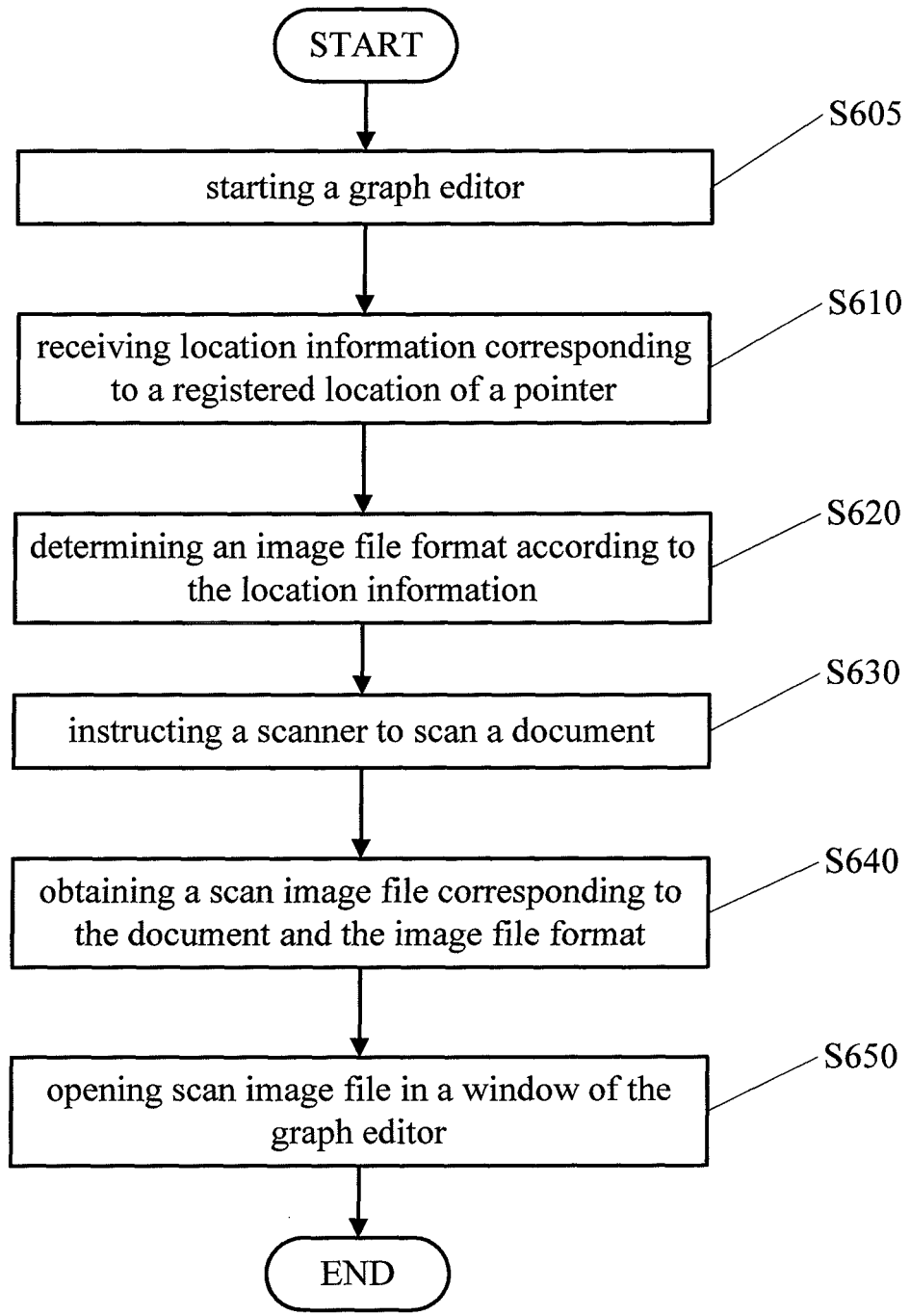
FIG. 14 is a flow chart of a method for adding scan data to a computer work area according to a fourth embodiment of the present invention.

FIG. 14 is a flow chart of a method for adding scan data to a computer work area according to a fourth embodiment of the present invention. Referring to FIG. 14 and FIG. 4, the method comprises the following steps.

Step S605: starting a graph editor (including viewers) AP2. The graph editor could be a variety of application programs which is intended for the use of, or could be used for, viewing and/or editing graphs, such as Photoshop, Volo View, web browsers, and etc. The step however can be omitted if the graph editor AP2 is already started.

Step S610: receiving location information corresponding to a registered location of a pointer ID. When the user moves the pointer ID to a window of the graph editor and/or clicks on a window of the graph editor AP2. The registered location of the pointer ID is at the window.

Step S620: determining an image file format according to the location information. Because the registered location of the pointer ID is at the window of the graph editor AP2, the computer 10 sets a graphical file format, e.g. jpeg, as the image file format for scan image files.

Step S630: instructing a scanner 20 to scan a document.

Step S640: obtaining a scan image file SF corresponding to the document and the image file format JPEG. After the scanner 20 completes the scan operation, the resulting scan image data DI is generated and transmitted to the computer 10. The computer 10 processes and converts the scan image data DI to a JPEG scan image file SF.

Step 650: opening the scan image file SF in the opened window or in a new window of the graph editor AP2. As shown in FIG. 4, the scan image file SF is opened in the graph editor AP2 for editing or browsing.

Figure 5:
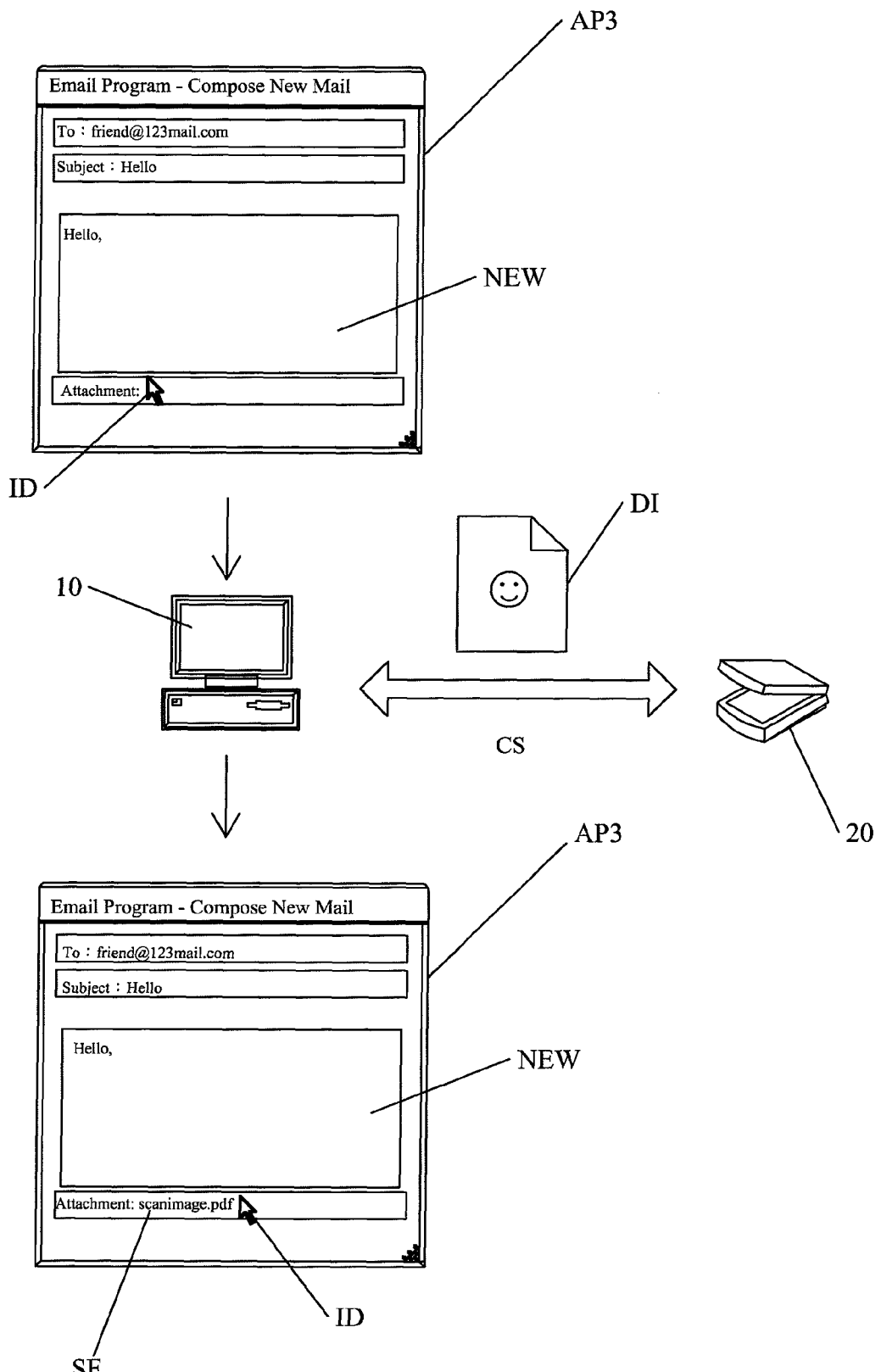
Figure 15:
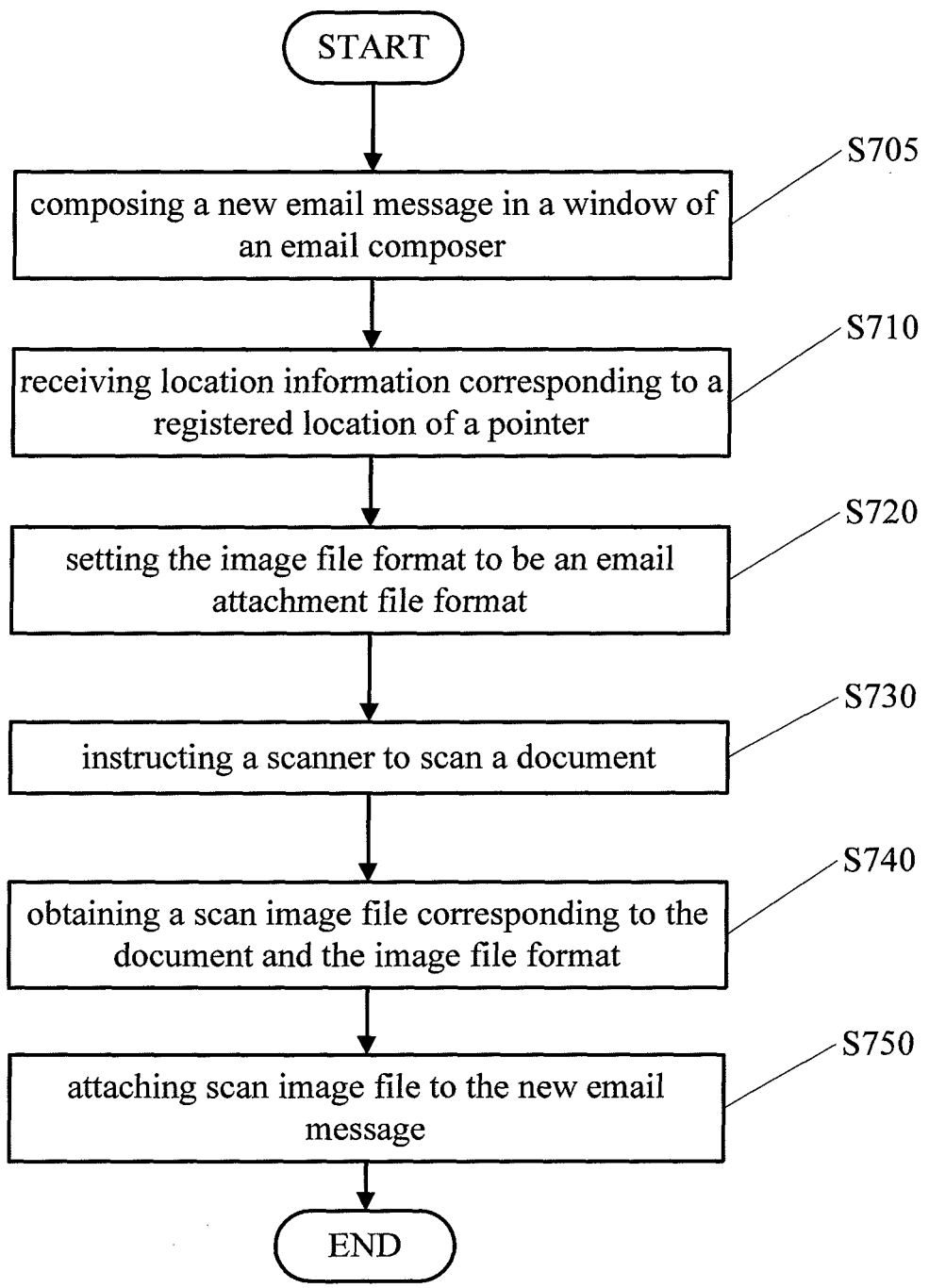
FIG. 15 is a flow chart of a method for adding scan data to a computer work area according to a fifth embodiment of the present invention.

FIG. 15 is a flow chart of a method for adding scan data to a computer work area according to a fifth embodiment of the present invention. Referring to FIG. 15 and FIG. 5, the method comprises the following steps.

Step S705: composing a new email message NEW in a window of an email composer AP3.

Step S710: receiving location information corresponding to a registered location of a pointer ID. When the user moves the pointer ID to the window of the new email message NEW and/or clicks on the window. The registered location of the pointer ID is at the window.

Step S720: determining an image file format according to the location information. Because the registered location of the pointer ID is at the window of the email composer AP3, the image file format is determined to be an email attachment file format.

Step S730: instructing a scanner 20 to scan a document.

Step S740: obtaining a scan image file SF corresponding to the document and the email attachment file format. After the scanner 20 completes the scan operation, the resulting scan image data DI is generated and transmitted to the computer 10. The computer 10 processes the scan image data DI into the scan image file SF and encrypts the scan image file SF according to the email attachment file format.

Step S750: attaching the scan image file SF to the new email message NEW, as shown in FIG. 5.

Figure 6:
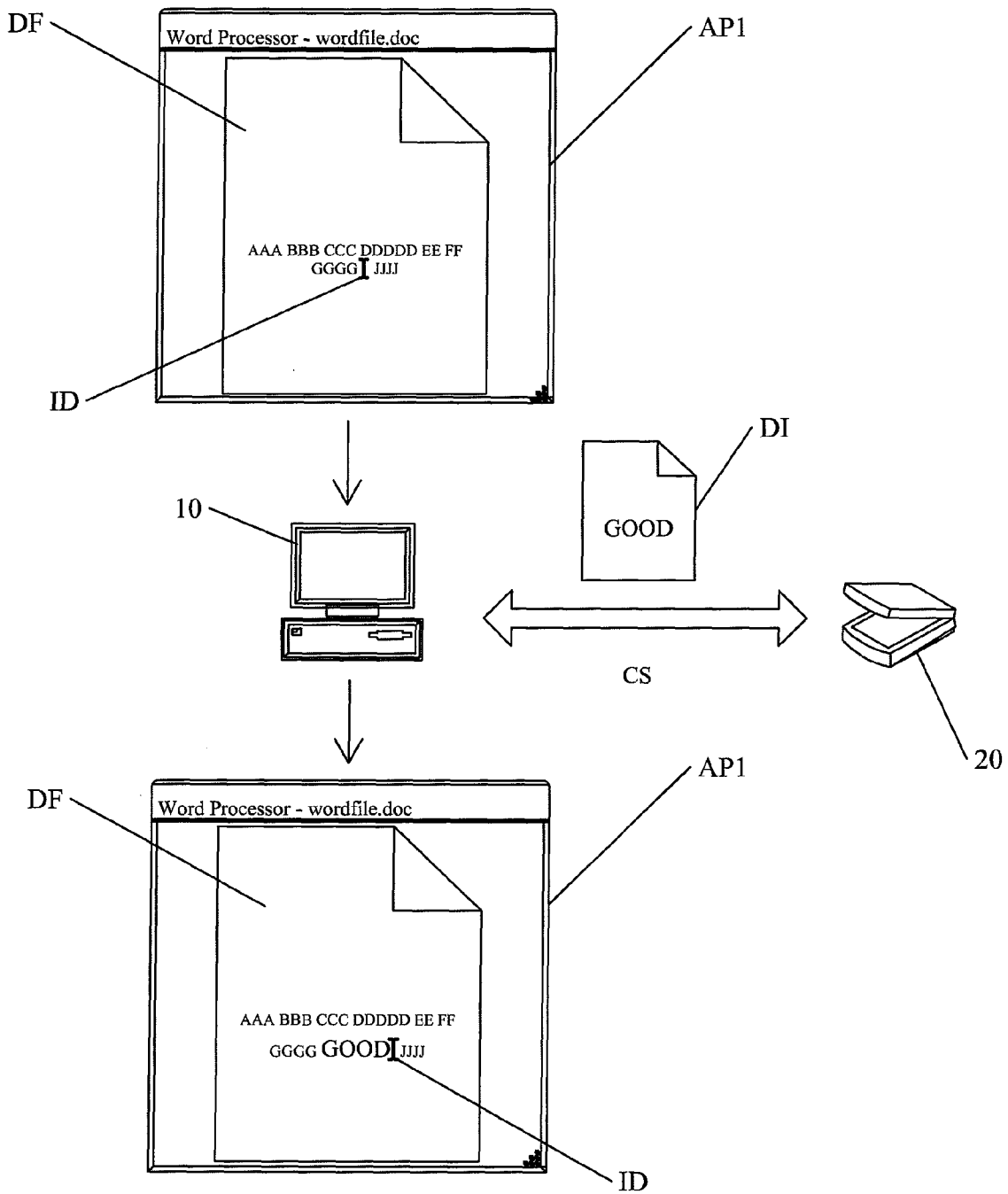
Figure 16:
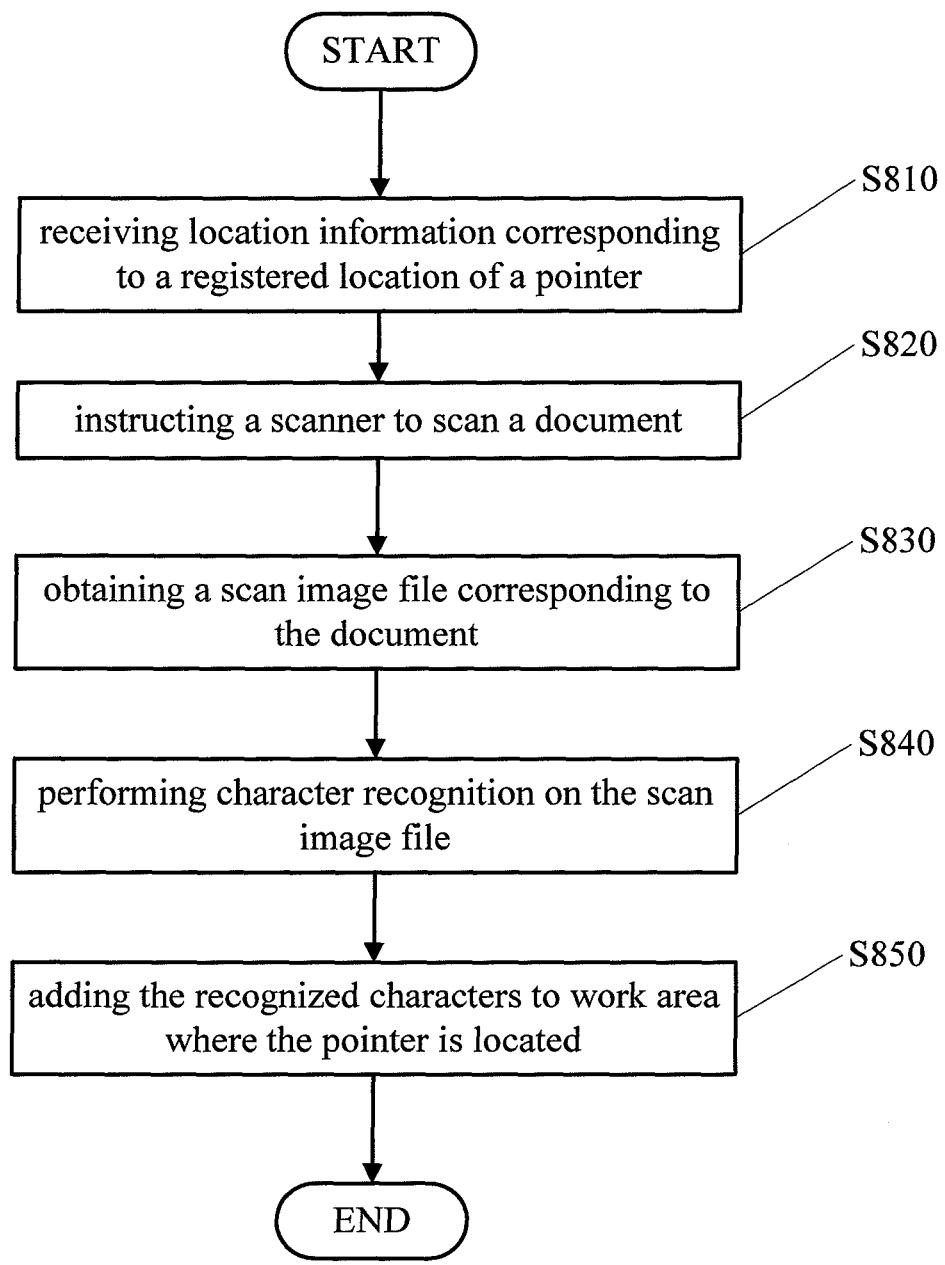
FIG. 16 is a flow chart of a method for adding scan data to a computer work area according to a sixth embodiment of the present invention.

FIG. 16 is a flow chart of a method for adding scan data to a computer work area according to a sixth embodiment of the present invention. Referring to FIG. 16 and FIG. 6, the method comprises the following steps.

Step S810: receiving location information corresponding to a registered location of a pointer ID. As shown in FIG. 6, a file DF is opened in a window of a word processor AP1 in the computer 10. The word processor AP1 can be any application programs which permit user to inputting or editing text, or creating text blocks, such as Word, Excel, PowerPoint. The pointer ID is moved to the text-input area of the opened file DF and the computer 10 receives the location information of the pointer ID as in the text-input area.

Step S820: instructing a scanner 20 to scan a document.

Step S830: obtaining a scan image file DI corresponding to the document. In this embodiment and the subsequent embodiments, the scanner 20 is a device with image-processing capability and converts scan image data into files.

Step S840: performing character recognition on the scan image file DI. After the scanner 20 completes the scan operation, the scanner 20 transmits the scan image file DI to the computer 10. Once receiving the scan image file DI, The computer 10 performs character recognition on the scan image file DI and generates the recognized characters in editable text format. Alternatively, steps S830 and S840 can be carried out by the scanner 20 alone. In this embodiment, the characters recognized are "GOOD".

Step S850: adding the recognized characters "GOOD" to a work area where the pointer ID is located. As shown in FIG. 6, the pointer ID is located between the words "GGGG" and "JJJJ" in the text-input area of the file DF; therefore, the recognized characters "GOOD" are inserted between the words "GGGG" and "JJJJ".

Figure 7:
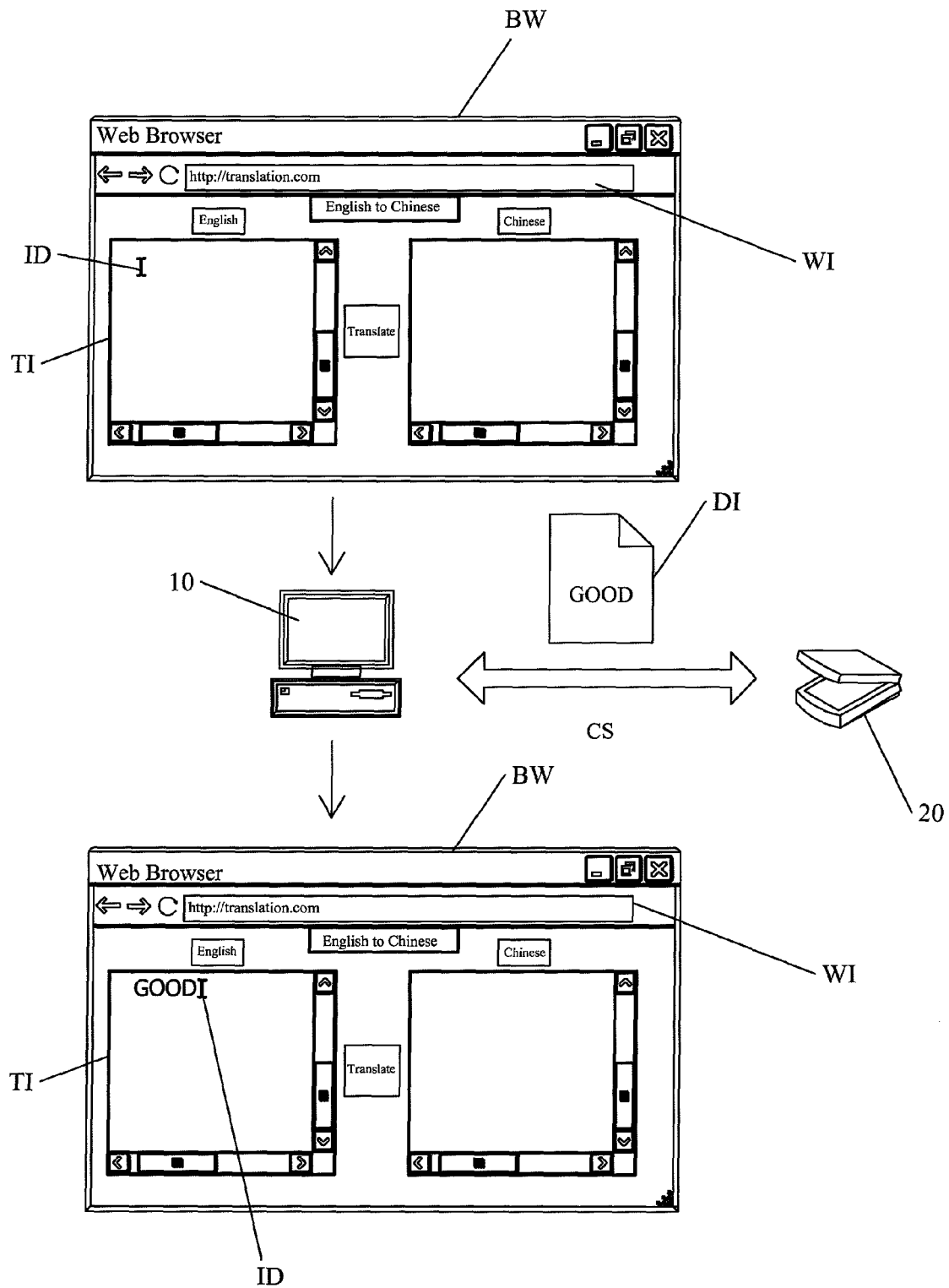

The work area of the present invention can also be a text-input area in a web page displayed in a web browser BW or the URL address input area in the window, as shown in FIG. 7. For example, the pointer ID is located in the text-input area TI. After the scanner 20 completes the scan of a document, the computer 10 performs character recognition on the scan image file DI and automatically inputs the recognized text in the text-input area. The user simply needs to press the "translate" button on the web page to translate foreign language text on the paper document, and this saves the time for typing the words.

Figure 8:
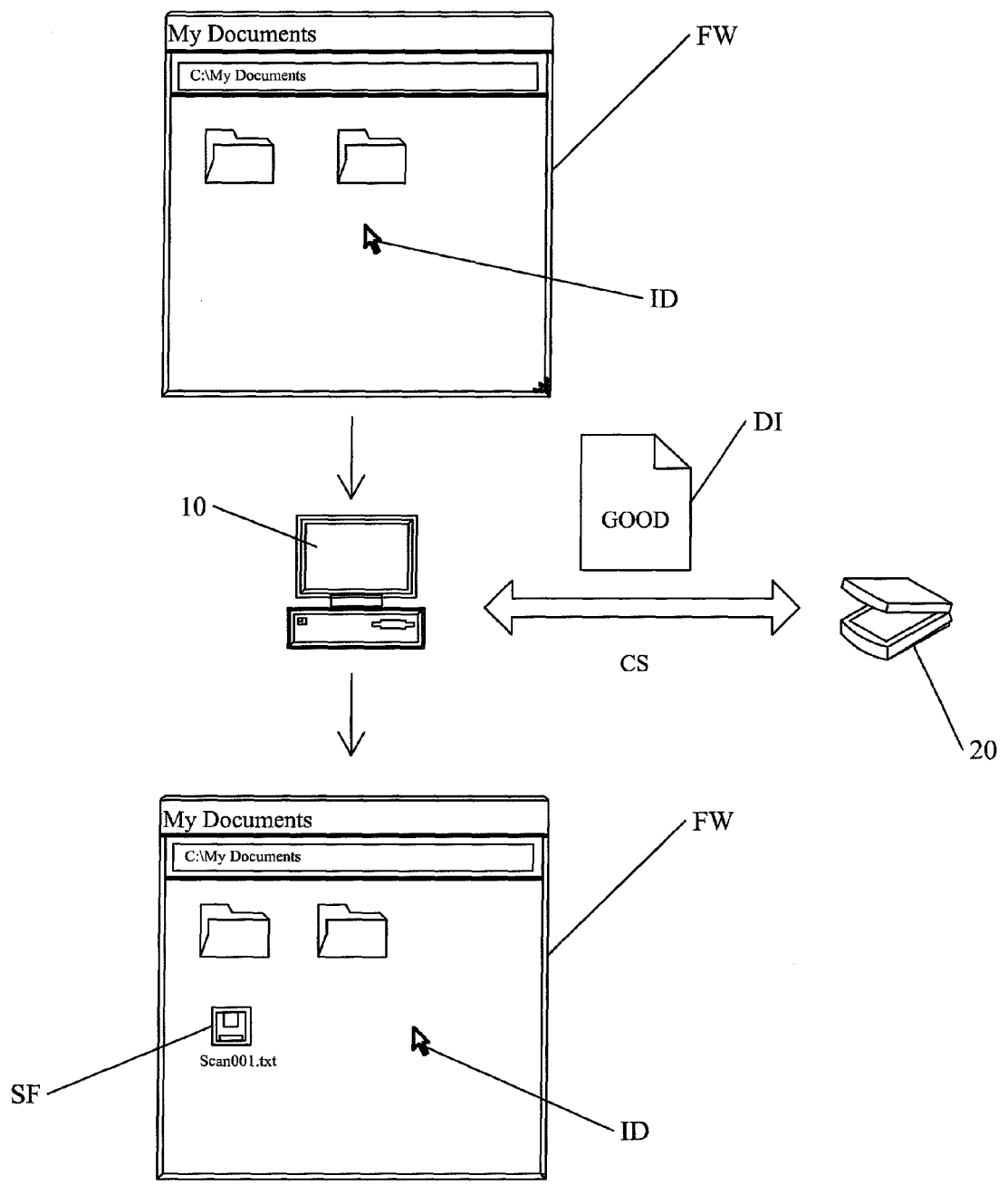
Figure 17:
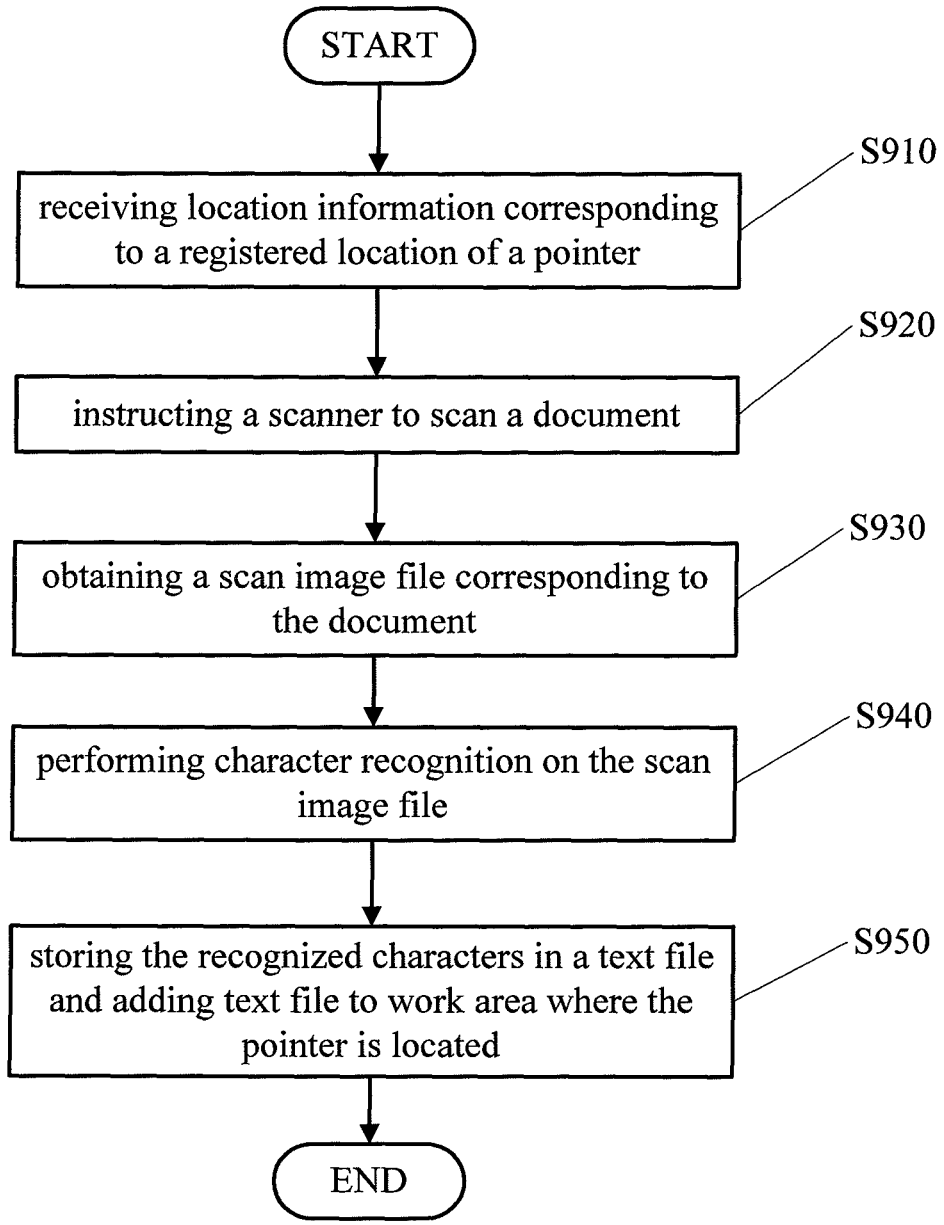
FIG. 17 is a flow chart of a method for adding scan data to a computer work area according to a seventh embodiment of the present invention.

FIG. 17 is a flow chart of a method for adding scan data to a computer work area according to a seventh embodiment of the present invention. Referring to FIG. 17 and FIG. 8, the method comprises the following steps.

Step S910: receiving location information corresponding to a registered location of a pointer ID. In this embodiment, as shown in FIG. 8, when the user moves the pointer ID to the inside of the window FW of the file folder "My Documents" or clicks on the window FW, the pointer ID is registered as located at the window FW. Other than an opened window of a selected file folder, the work area in this embodiment could also be a selected file folder displayed in any form, the desktop of the OS, or an area for attaching files which will be explained with reference to FIG. 9.

Step S920: instructing a scanner 20 to scan a document.

Step S930: obtaining a scan image file DI corresponding to the document.

Step S940: performing character recognition on the scan image file DI. Note that steps S920, S930 and S940 are identical to steps S820, S830 and S840 of the sixth embodiment, and therefore detailed descriptions thereof will be omitted.

Step S950: storing the recognized characters "GOOD" in a text file SF and adding the text file SF to a work area where the pointer ID is located. As shown in FIG. 8, the pointer ID is located in the window FW; therefore the text file SF (i.e. Scan001.txt) is stored in the storage path of the "My Documents" file folder. The text file SF may be in the format of .txt, .rtf, .xps, .doc, or in the searchable pdf format.

Figure 9:
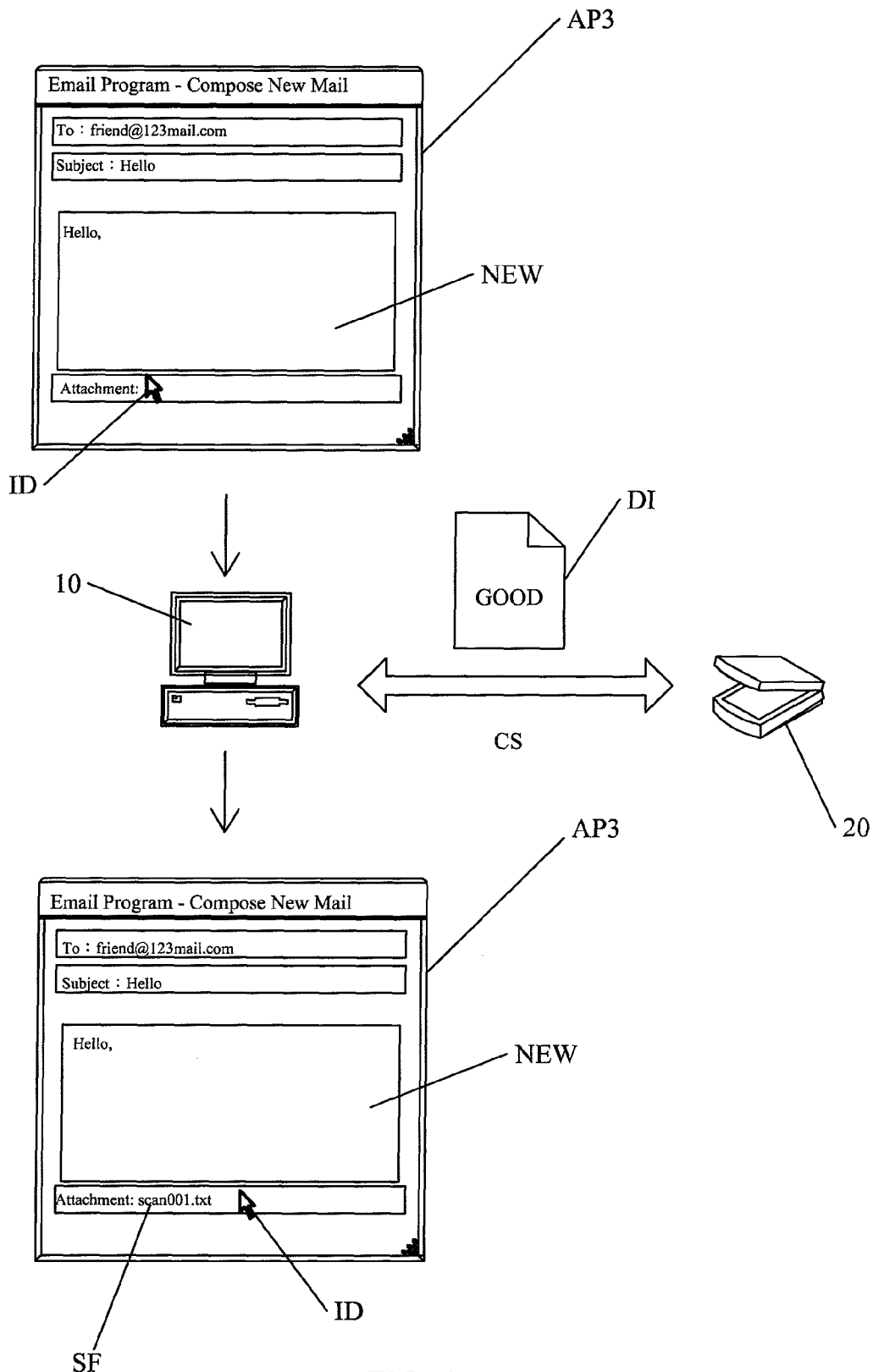

If the work area is an email composer, when the pointer ID is located at the email composer AP3, or a web-based email composer, and in the area for attaching files, as shown in FIG. 9, the computer 10 will store the recognized characters in a text file SF and attach the text file SF to the composing email message NEW. If the pointer ID is located in the subject or message area of the email message NEW, the method of the sixth embodiment can be implemented to insert the recognized characters in the designated area.

According to the present invention, scan image files or corresponding text data can be directly and automatically added to the current user working area, which allows users to effortlessly locate the scan data and reduces the time for presetting the scan function parameters.

While the present invention has been described with respect to a limited number of embodiments, it is to be understood that the present invention is not limited to the disclosed exemplary embodiments. It is intended that the appended claims cover all modifications, equivalent structures and variations as fall within the true spirit and scope of this present invention. The specification and drawings are, accordingly, to be regarded in an illustrative rather than a restrictive sense.

What is claimed is:

1. A method for adding scan data to a computer work area, used in a computer system, comprising steps of:
   receiving location information corresponding to a registered location of a pointer;
   determining an image file format according to the location information;
   instructing a scanner to scan a document after the step of receiving the location information;
   obtaining a scan image file corresponding to the document and the image file format; and
   adding the scan image file to a work area where the pointer is located.

2. The method of claim 1, wherein the step of adding the scan image file to the work area comprises:
   inserting the scan image file in an opened file.

3. The method of claim 2, wherein the step of inserting the scan image file in the opened file comprises:
   inserting the scan image file in the opened file at the registered location; wherein the registered location is between two characters.

4. The method of claim 1, wherein the step of adding the scan image file to the work area comprises:
   storing the scan image file at a location corresponding to a storage path of the work area.

5. The method of claim 4, wherein the work area is a selected file folder in an operating system.

6. The method of claim 4, wherein the work area is a desktop environment in an operating system.

7. The method of claim 1, wherein the step of adding the scan image file to the work area comprises:
   opening the scan image file in the work area, wherein the work area is a window of a graph editor or viewer program.

8. The method of claim 1, wherein the step of adding the scan image file to the work area comprises:
   attaching the scan image file to an email message.

9. A method for adding scan data to a computer work area, used in a computer system, comprising steps of:
   receiving location information corresponding to a registered location of a pointer;
   instructing a scanner to scan a document after the step of receiving the location information;
   obtaining a scan image file corresponding to the document;
   performing character recognition on the scan image file; and
   adding the recognized characters to a work area where the pointer is located.

10. The method of claim 9, wherein the work area is a text input area in an application window.

11. The method of claim 9, wherein the step of adding the recognized characters to the work area comprises:
    storing the recognized characters as a text file and adding the text file to the work area.

12. The method of claim 11, wherein the work area is a selected file folder in an operating system.

13. The method of claim 11, wherein the work area is a desktop environment in an operating system.

14. The method of claim 11, wherein the work area is an email message.

15. The method of claim 9 being performed without opening the scan image file by a user manually for post-editing.

16. The method of claim 1 being performed without opening the scan image file by a user manually for post-editing.

* * * * *